United States Patent

Inoue

[11] Patent Number: 5,969,075
[45] Date of Patent: Oct. 19, 1999

[54] PROCESS FOR THE PRODUCTION OF ROOM TEMPERATURE CURABLE ORGANOPOLYSILOXANE COMPOSITIONS

[75] Inventor: Yoshifumi Inoue, Akron, Ohio

[73] Assignees: Shin-Etsu Silicones of America, Akron, Ohio; Shin-Etsu Chemical Co., Ltd., Tokyo, Japan

[21] Appl. No.: 09/114,174

[22] Filed: Jul. 13, 1998

[51] Int. Cl.⁶ .................................................. C08G 77/08
[52] U.S. Cl. ................................ 528/15; 528/16; 528/17; 528/18; 528/19; 528/34; 528/38
[58] Field of Search .................................. 528/15, 18, 17, 528/19, 16, 34, 38

[56] References Cited

U.S. PATENT DOCUMENTS 4,147,855  4/1979  Schiller et al. ............................ 528/23
4,487,907  12/1984  Fukayama et al. ....................... 528/32
4,973,623  11/1990  Haugsby et al. .
5,525,660  6/1996  Shono et al. .
5,718,874  2/1998  Moscony et al. ....................... 423/139

*Primary Examiner*—Melvyn I. Marquis
*Attorney, Agent, or Firm*—Birch, Stewart, Kolasch & Birch, LLP

[57] ABSTRACT

A room temperature curable organopolysiloxane composition comprising (A) an organopolysiloxane having at least two hydroxyl groups, (B) finely divided silica, (C) an amino-bearing silane, (D) an organic silicon compound, and (E) a curing catalyst is prepared by mixing components (A) and (B) with component (C) and thereafter, mixing components (D) and (E).

3 Claims, No Drawings

PROCESS FOR THE PRODUCTION OF ROOM TEMPERATURE CURABLE ORGANOPOLYSILOXANE COMPOSITIONS

BACKGROUND OF THE INVENTION

1. Field of the Invention

This invention relates to a process for producing room temperature curable organopolysiloxane compositions suitable for use as sealing agents and coating agents.

2. Prior Art

RTV silicone rubber compositions of the condensation reaction type are well known in the art which cure into silicone rubber at room temperature in the presence of moisture in air. They are widely used as sealing agents, adhesives and potting agents in a variety of industrial fields including mechanical, electrical and building fields.

In silicone rubber compositions, finely divided silica is often used as a reinforcing filler. High loading of silica is necessary in order to achieve a high strength or tear strength. High loading of silica, however, imparts thixotropy to RTV silicone rubber compositions. When such thixotropic compositions are applied, the coatings in uncured state lack sags and runaway and hence, self-leveling. In order that such coatings be self-leveling, it is a common practice to heat treat a mixture of the base polymer and the filler at 150 to 180° C. for about 1 to 2 hours. However, the heat treatment is disadvantageous from the time and cost standpoints.

Therefore, an object of the invention is to provide a method for preparing a room temperature curable organopoly-siloxane composition which method is successful in improving the flow and self-leveling of the composition without a need for heat treatment, so that the composition is suitable as sealing agents and coating agents.

SUMMARY OF THE INVENTION

The method of the present invention is to prepare a room temperature curable organopolysiloxane composition comprising as main components, (A) an organopolysiloxane bearing at least two hydroxyl groups each attached to a silicon atom in a molecule and having a viscosity of 100 to 500,000 centistokes at 25° C.

(B) finely divided silica, (C) an amino-bearing silane and/or a partial hydrolyzate condensate thereof, (D) an organic silicon compound of the following formula:

$$R_a SiX_{4-a}$$

wherein R is a substituted or unsubstituted monovalent hydrocarbon group of 1 to 10 carbon atoms, X is a ketoxime, alkoxy or 1-methylvinyloxy group, and letter a is equal to 0, 1 or 2, and/or a partial hydrolyzate condensate thereof, and (E) a curing catalyst. According to the method of the invention, components (A) and (B) are mixed with component (C) before components (D) and (E) are mixed therewith.

The invention pertains to a room temperature curable organopolysiloxane composition comprising components (A) to (E) defined above. In preparing the composition by blending the components, amino-bearing silane (C) is added to and mixed with organopolysiloxane (A) or a mixture of organo-polysiloxane (A) and finely divided silica (B) to form a, premix and thereafter, curing agent (D), curing catalyst (E) and optional components are added to and mixed with the premix. The resulting composition exhibits good flow and self-leveling properties without a need for heat treatment. The composition is suitable as sealing agents and coating agents.

It is noted that the room temperature curable organopolysiloxane composition comprising components (A) to (E) defined above is per se known in the art. Most often, this composition is prepared by mixing components (A) and (B), heat treating the mixture to impart fluidity, and finally adding components (C), (D) and (E). USSN 08/770,108, filed Dec. 19, 1996, U.S. Pat. No. 5,718,874 assigned to the same assignee as the present invention (corresponding to Japanese Patent Application No. 176490/1997) proposes a process involving mixing components (A) and (B), then mixing components (D) and (E) therewith, and finally adding component (C), for the purpose of rendering the composition non-fluidized (that is, anti-sagging and anti-stringing). The process of USSN 08/770,108 has an inverse object to the present invention which aims to impart fluidity without heat treatment.

DETAILED DESCRIPTION OF THE INVENTION

The process of the present invention is to prepare a room temperature curable organopolysiloxane composition comprising (A) organopolysiloxane, (B) finely divided silica, (C) amino-bearing silane, (D) curing agent, and (E) curing catalyst as main components.

Component (A) is an organopolysiloxane bearing at least two hydroxyl groups each attached to a silicon atom in a molecule and having a viscosity of 100 to 500,000 centistokes at 25° C. Preferably, it is an organopoly-siloxane blocked with a hydroxyl group at either end represented by the following formula (1).

$$HO(R^1R^2SiO)_nH \tag{1}$$

In formula (1), $R^1$ and $R^2$, which may be the same or different, are independently selected from substituted or unsubstituted monovalent hydrocarbon groups having 1 to 10 carbon atoms, preferably 1 to 8 carbon atoms, for example, alkyl groups such as methyl, ethyl, propyl and butyl, cycloalkyl groups such as cyclohexyl, alkenyl groups such as vinyl and allyl, aryl groups such as phenyl and tolyl, aralkyl groups such as benzyl and phenylethyl, and substituted ones of these groups wherein some or all of the hydrogen atoms attached to carbon atoms are replaced by halogen atoms, cyano groups or the like, such as chloromethyl, trifluoropropyl and cyanoethyl. Methyl and phenyl are preferred. Letter n is such a number that the diorganopolysiloxane may have a viscosity of 100 to 500,000 centistokes at 25° C., preferably 1,000 to 100,000 centistokes at 25° C.

Component (B) is finely divided silica which serves to impart strength to the cured composition. Examples of the finely divided silica include fumed silica, fired silica, precipitated silica, which are optionally surface treated with chlorosilanes, silazanes or organosiloxanes for rendering the surface hydrophobic. Preferably the silica has a specific surface area of at least 50 m²/g, especially 100 to 400 m²/g as measured by the BET method.

An appropriate amount of component (B) blended is about 3 to 50 parts, especially about 5 to 25 parts by weight per 100 parts by weight of component (A). Less than 3 parts of component (B) would fail to impart strength to cured parts whereas more than 50 parts of component (B) would adversely affect the discharge and working properties of the composition.

Component (C) is a silane bearing at least one amino group in a molecule and/or a partial hydrolyzate condensate thereof. In addition to the amino group, the silane has another organic group attached to a silicon atom. Examples of the organic group include alkoxy groups of 1 to 6 carbon atoms such as methoxy and ethoxy, alkyl groups of 1 to 6 carbon atoms such as methyl, ethyl, propyl and butyl, alkenyl groups of 2 to 6 carbon atoms such as vinyl, aryl groups of 6 to 10 carbon atoms such as phenyl, substituted ones of these groups wherein some or all of the hydrogen atoms are replaced by halogen atoms, cyano groups or the like, such as chloromethyl, cyanoethyl and 3,3,3-trifluoropropyl. Of these, alkoxy groups, especially methoxy and ethoxy are preferred.

Illustrative examples of the amino-bearing silane are given below. In the following formulae, Me is methyl, Et is ethyl, and Vi is vinyl.

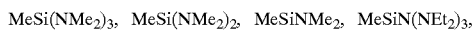
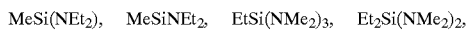
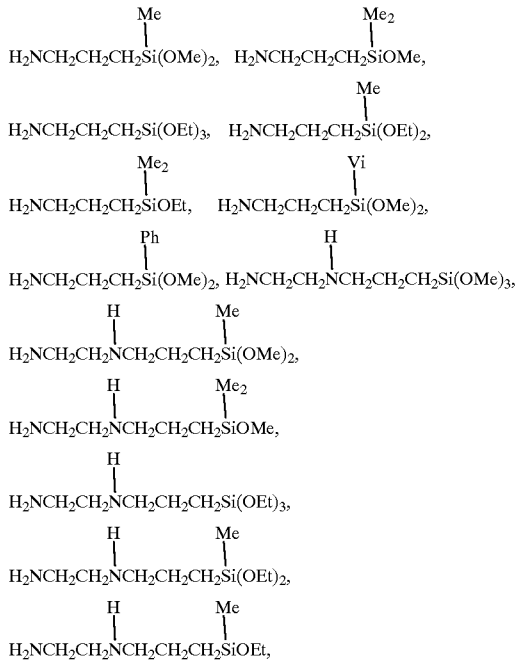

Of the foregoing examples, silanes having an amino-bearing group and two or three alkoxy groups are preferred. Especially preferred are γ-aminopropyltrimethoxysilane, γ-aminopropyltriethoxysilane, N-β-aminoethyl-γ-aminopropyl-trimethoxysilane N-β-aminoethyl-γ-aminopropylmethyl-dimethoxysilane, and N-phenyl-γ-aminopropyltrimethoxysilane.

An appropriate amount of component (C) blended is about 0.05 to 10 parts, especially about 0.1 to 3 parts by weight per 100 parts by weight of component (A). Less than 0.05 part of component (C) would fail to impart fluidity whereas more than 10 parts of component (C) would adversely affect the physical properties of cured parts.

Component (D) serving as a curing agent is an organic silicon compound and/or a partial hydrolyzate condensate thereof. The organic silicon compound is of the following formula:

$$R_aSiX_{4-a} \quad (2)$$

wherein R is a substituted or unsubstituted monovalent hydrocarbon group of 1 to 10 carbon atoms, X is a ketoxime, alkoxy or 1-methylvinyloxy group, and letter a is equal to 0, 1 or 2.

More particularly, R is independently selected from substituted or unsubstituted monovalent hydrocarbon groups of 1 to 10 carbon atoms, preferably 1 to 8 carbon atoms, for example, alkyl groups such as methyl, ethyl, propyl and butyl, cycloalkyl groups such as cyclohexyl, alkenyl groups such as vinyl and allyl, aryl groups such as phenyl and tolyl, aralkyl groups such as benzyl and phenylethyl, and substituted ones of these groups wherein some or all of the hydrogen atoms attached to carbon atoms are replaced by halogen atoms, cyano groups or the like, such as chloromethyl, trifluoropropyl and cyanoethyl. Methyl, ethyl, vinyl and phenyl are preferred.

X is selected from ketoxime, alkoxy and 1-methylvinyloxy groups. When X is ketoxime, exemplary organic silicon compounds are silane compounds such as methyltris(diethylketoxime)silane, methyltris(methylethylketoxime)silane, vinyltris(methylethylketoxime)silane, and phenyltris(diethylketoxime)silane and partial hydrolyzate condensates thereof.

When X is alkoxy, exemplary organic silicon compounds are silane compounds such as trimethoxymethylsilane, trimethoxyphenylsilane, trimethoxyvinylsilane, triethoxymethylsilane, triethoxyphenylsilane, triethoxyvinylsilane, and tetramethoxysilane and partial hydrolyzate condensates thereof.

When X is 1-methylvinyloxy, exemplary organic silicon compounds are silane compounds such as tri(1-methylvinyloxy)methylsilane, tri(1-methylvinyloxy)phenylsilane, and tri(1-methylvinyloxy)vinylsilane and partial hydrolyzate condensates thereof.

An appropriate amount of component (D) blended is about 1 to 30 parts, especially about 3 to 20 parts by weight per 100 parts by weight of component (A). Compositions with less than 1 part of component (D) would become unstable and gel during storage whereas more than 30 parts of component (D) would induce greater cure shrinkage, adversely affecting the cured properties.

Component (E) is a curing catalyst which is selected from metal salts of carboxylic acids such as tin octoate, cobalt octoate, manganese octoate, zinc octoate, tin octynate, tin caprylate, and tin oleate; organic tin compounds such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin, dioctyltin dilaurate; organic titanates such as tetrabutyl titanate, tetra-1-ethylhexyl titanate, triethanolamine titanate, and tetra(isopropenyloxy) titanate; organic titanium compounds such as organosiloxytitanium and β-carbonyltitanium; and alkoxyaluminum compounds.

Silanes containing a granidyl group are also included. Examples are given below.

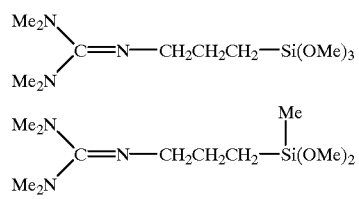

-continued

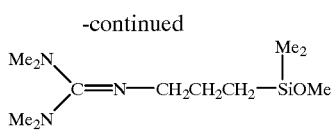

The amount of component (E) blended is preferably about 0.01 to 10 parts, especially about 0.1 to 2 parts by weight per 100 parts by weight of component (A). Compositions with less than 0.01 part of component (E) would become less curable whereas more than 10 parts of component (E) would accelerate curing too much or adversely affect the cured strength.

The method of the invention uses various mixers and kneaders in mixing the components. According to the invention, components (A) and (B) are mixed with component (C) before components (D) and (E) are mixed therewith. When components (A) and (B) are mixed with component (C), the order of mixing components (A), (B) and (C) may be simultaneous mixing of components (A), (B) and (C), or premixing of components (A) and (C), followed by mixing of component (B), or premixing of components (A) and (B), followed by mixing of component (C). The procedure of premixing of components (A) and (C), followed by mixing of component (B) is recommended. The premixing of components (A) and (C) helps to impart fluidity to the composition. These mixing steps are preferably carried out in a substantially anhydrous state, for example, in vacuum or in a nitrogen purged state. After components (A), (B) and (C) are mixed in this way, components (D) and (E) are mixed with this premix. This mixing is also preferably carried out in a substantially anhydrous state.

The mixing steps may be carried out at room temperature usually in the range of 5 to 30° C., especially 15 to 25° C., that is, without heating. There is no need to carry out heat treatment at 40° C. or higher, especially 80° C. or higher, on the mixture resulting from every mixing step.

The room temperature curable organopolysiloxane composition thus obtained is improved in fluidity and self-leveling without a need for heat treatment and thus ready to apply as coating agents and sealing agents. The composition can be prepared in a simple manner and at a low cost.

In the composition, well-known fillers and additives may be blended insofar as fluidity is not lost. Useful fillers include reinforcing fillers such as carbon powder, talc and bentonite, fibrous fillers such as asbestos, glass fibers, carbon fibers and organic fibers, fillers such as calcium carbonate, zinc carbonate, zinc oxide, magnesium oxide and Celite, and network polysiloxane resins comprising triorganosiloxy units and $SiO_2$ units. Useful additives include heat resistance and freeze resistance modifiers such as red iron oxide and cerium oxide, dehydrating agents, rust preventing agents, antibacterial agents, antifungal agents, plasticizers, coloring agents, and flame retarding agents. Preferably, these fillers and additives are mixed prior to the mixing of components (D) and (E).

EXAMPLE

Examples of the invention are given below by way of illustration and not by way of limitation. All parts are by weight. The viscosity is a measurement at 25° C.

Example I

A uniform mixture P-1 was prepared by premixing 100 parts of a polydimethylsiloxane blocked with a hydroxyl group at each end and having a viscosity of 20,000 centipoise as component (A) with 1 part of γ-aminopropyltriethoxysilane as component (C), adding 12 parts of finely divided silica (Aerosil R972 by Degussa) as component (B) to this premix, and mixing them.

To the mixture P-1, a curing agent (D) and a curing catalyst (E) were added as shown in Table 1.

In the above steps, each mixing was carried out at room temperature (25° C.).

The resulting compositions were examined by a slump test according to ASTM D2202. The results are shown in Table 1.

TABLE 1

|  | Example | | |
| --- | --- | --- | --- |
|  | I-1 | I-2 | I-3 |
| P-1 | 113 | 113 | 113 |
| Methyltris(methylethylketoxime)silane | 7 | — | — |
| Methyltrimethoxysilane | — | 7 | — |
| Vinyltri(1-methylvinyloxy)silane | — | — | 7 |
| Dibutyltin dilaurate | 0.1 | 0.1 | — |
| $Me_2\!\!>\!\!C\!=\!N\!-\!CH_2CH_2CH_2\!-\!Si(OMe)_3$ / $Me_2$ | — | — | 0.5 |
| Slump test (cm) | sag >10 | sag >10 | sag >10 |

After the compositions were stored for 12 months, they still held satisfactory slump and self-leveling properties.

Comparative Example I

A mixture P-2 was prepared by mixing 100 parts of the polydimethylsiloxane used as component (A) in Example I with 12 parts of the silica used as component (B) in Example I at room temperature.

To the mixture P-2, components (C), (D) and (E) were added and mixed at room temperature as shown in Table 2. The resulting compositions were examined by a slump test, with the results being also shown in Table 2.

TABLE 2

|  | Comparative Example | | | | | |
| --- | --- | --- | --- | --- | --- | --- |
|  | I-1 | I-2 | I-3 | I-4 | I-5 | I-6 |
| P-2 | 112 | 112 | 112 | 112 | 112 | 112 |
| Methyltris(methylethylketoxime)silane | 7 | — | — | 7 | — | — |
| Methyltrimethoxysilane | — | 7 | — | — | 7 | — |
| Vinyltri(1-methylvinyloxy)silane | — | — | 7 | — | — | 7 |
| Dibutyltin dilaurate | 0.1 | 0.1 | — | 0.1 | 0.1 | — |

TABLE 2-continued

|  | Comparative Example | | | | | |
|---|---|---|---|---|---|---|
|  | I-1 | I-2 | I-3 | I-4 | I-5 | I-6 |
| Me$_2$C=N—CH$_2$CH$_2$CH$_2$—Si(OMe)$_3$ / Me$_2$ | — | — | 0.5 | — | — | — |
| H$_2$NCH$_2$CH$_2$CH$_2$Si(OEt)$_3$ | — | — | — | 1 | 1 | 1 |
| Slump test (cm) | 0 | 0 | 0 | 2 | 3 | 2 |

Reference Example

The mixture P-2 of polydimethylsiloxane and silica prepared in Comparative Example I was heat treated at 150° C. for 2 hours. To the heat treated mixture P-2, components (C), (D) and (E) were added at room temperature as shown in Table 3. The resulting compositions were examined by a slump test, with the results being also shown in Table 3.

TABLE 3

|  | Reference Example | | |
|---|---|---|---|
| P-2 | 112 | 112 | 112 |
| Methyltris(methylethylketoxime)silane | 7 | — | — |
| Methyltrimethoxysilane | — | 7 | — |
| Vinyltri(1-methylvinyloxy)silane | — | — | 7 |
| Dibutyltin dilaurate | 0.1 | 0.1 | — |
| Me$_2$C=N—CH$_2$CH$_2$CH$_2$—Si(OMe)$_3$ / Me$_2$ | — | — | 0.5 |
| H$_2$NCH$_2$CH$_2$CH$_2$Si(OEt)$_3$ | 1 | 1 | 1 |
| Slump test (cm) | sag >10 | sag >10 | sag >10 |

Comparative Example II

With the mixture P-2 of polydimethylsiloxane and silica prepared in Comparative Example I, components (D) and (E) were mixed at room temperature as shown in Table 4, and aminopropyltriethoxysilane (C) was finally mixed at room temperature. The resulting compositions were examined by a slump test, with the results being also shown in Table 4.

TABLE 4

|  | Comparative Example | | |
|---|---|---|---|
|  | II-1 | II-2 | II-3 |
| P-2 | 112 | 112 | 112 |
| Methyltris(methylethylketoxime)silane | 7 | — | — |
| Methyltrimethoxysilane | — | 7 | — |
| Vinyltri(1-methylvinyloxy)silane | — | — | 7 |
| Dibutyltin dilaurate | 0.1 | 0.1 | — |
| Me$_2$C=N—CH$_2$CH$_2$CH$_2$—Si(OMe)$_3$ / Me$_2$ | — | — | 0.5 |
| H$_2$NCH$_2$CH$_2$CH$_2$Si(OEt)$_3$ | 1 | 1 | 1 |
| Slump test (cm) | 0 | 0 | 0 |

Example II

A mixture P-3 was prepared by premixing 100 parts of the polydimethylsiloxane used as component (A) in Example I with 12 parts of finely divided silica (Aerosil 200 by Degussa) as component (B), then adding and mixing 1.5 parts of N-β-aminoethyl-γ-aminopropyltrimethoxysilane as component (C) with the premix.

To the mixture P-3, components (D) and (E) were added as shown in Table 5. The resulting compositions were examined by a slump test, with the results being also shown in Table 5.

In the above steps, each mixing was carried out at room temperature (25° C.).

TABLE 5

|  | Example | | |
|---|---|---|---|
|  | II-1 | II-2 | II-3 |
| P-3 | 113.5 | 113.5 | 113.5 |
| Vinyltris(methylethylketooxime)silane | 7 | — | — |
| Vinyltrimethoxysilane | — | 7 | — |
| Phenyltri(1-methylvinyloxy)silane | — | — | 7 |
| Dibutyltin dimethoxide | 0.05 | 0.05 | — |
| Me$_2$C=N—CH$_2$CH$_2$CH$_2$—Si(OMe)$_3$ / Me$_2$ | — | — | 0.5 |
| Slump test (cm) | sag >10 | sag >10 | sag >10 |

After the compositions II-1, II-2 and II-3 were stored for 12 months, their slump and self-leveling properties remained unchanged from the initial.

As is evident from the above Examples and Comparative Examples, the room temperature curable organopolysiloxane compositions prepared by the method of the invention are significantly improved in self-leveling before curing and thus adequate as sealing agents and coating agents.

Although some preferred embodiments have been described, many modifications and variations may be made thereto in the light of the above teachings. It is therefore to be understood that within the scope of the appended claims, the invention may be practiced otherwise than as specifically described.

I claim:

1. A process for preparing a room temperature curable organopolysiloxane composition comprising as main components,
   (A) an organopolysiloxane bearing at least two hydroxyl groups each attached to a silicon atom in a molecule and having a viscosity of 100 to 500,000 centistokes at 25° C.,
   (B) finely divided silica,
   (C) an amino-bearing silane and/or a partial hydrolyzate condensate thereof, (D) an organic silicon compound of the following formula:

wherein R is a substituted or unsubstituted monovalent hydrocarbon group of 1 to 10 carbon atoms, X is a ketoxime, alkoxy or 1-methylvinyloxy group, and letter a is equal to 0, 1 or 2, and/or a partial hydrolyzate condensate thereof, and (E) a curing catalyst, said method comprising the steps of mixing components (A) and (B) with component (C) and thereafter, mixing components (D) and (E) therewith.

2. The process of claim 1 wherein the step of mixing components (A) and (B) with component (C) includes premixing component (A) with component (C) and then mixing component (B) therewith.

3. The process of claim 1 wherein the mixing steps are carried out without heating.

* * * * *